(12) United States Patent
Beille et al.

(10) Patent No.: US 9,595,722 B2
(45) Date of Patent: Mar. 14, 2017

(54) FUEL CELL PLATE AND FUEL CELL

(75) Inventors: Florent Beille, Aix en Provence (FR);
Christian Quintieri, Aix en Provence (FR); Didier Vannucci, La Ciotat (FR); Frédéric Le Fol, Peypin (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 364 days.

(21) Appl. No.: 14/131,235

(22) PCT Filed: Jul. 9, 2012

(86) PCT No.: PCT/EP2012/063411
§ 371 (c)(1),
(2), (4) Date: Feb. 6, 2014

(87) PCT Pub. No.: WO2013/007692
PCT Pub. Date: Jan. 17, 2013

(65) Prior Publication Data
US 2014/0147768 A1    May 29, 2014

(30) Foreign Application Priority Data
Jul. 8, 2011    (FR) .................................. 11 56248

(51) Int. Cl.
*H01M 8/02* (2016.01)
*H01M 8/24* (2016.01)
*H01M 8/10* (2016.01)
*H01M 8/12* (2016.01)

(52) U.S. Cl.
CPC ....... *H01M 8/0228* (2013.01); *H01M 8/0254* (2013.01); *H01M 8/0297* (2013.01); *H01M 8/241* (2013.01); *H01M 2008/1095* (2013.01); *H01M 2008/1293* (2013.01); *Y02E 60/50* (2013.01); *Y02E 60/525* (2013.01)

(58) Field of Classification Search
CPC .. H01M 8/0254; H01M 8/0297; H01M 8/241; H01M 8/0228
USPC .................... 429/468, 508, 457, 463, 469
See application file for complete search history.

(56) References Cited

U.S. PATENT DOCUMENTS

| | | | |
|---|---|---|---|
| 2002/0086196 A1 | 7/2002 | Utsunomiya et al. | |
| 2005/0130016 A1* | 6/2005 | Yang | H01M 8/0258 429/465 |
| 2006/0141318 A1* | 6/2006 | MacKinnon | H01M 8/0206 429/457 |
| 2006/0246340 A1 | 11/2006 | Zhang et al. | |
| 2007/0184327 A1* | 8/2007 | Ishioka | H01M 8/0273 429/457 |
| 2008/0026279 A1* | 1/2008 | Kobuchi | H01M 8/0228 429/482 |

(Continued)

FOREIGN PATENT DOCUMENTS

| | | |
|---|---|---|
| EP | 1 686 641 A1 | 8/2006 |
| FR | 2 899 386 A1 | 10/2007 |

*Primary Examiner* — Sean P Cullen
(74) *Attorney, Agent, or Firm* — Davidson, Davidson & Kappel, LLC

(57) ABSTRACT

A plate for a fuel cell consisting of a stack of plates and membrane electrode assemblies is provided. The plate includes at least one striated sealing surface for bearing in a sealed manner against a membrane electrode assembly or against another fuel cell plate. The plate is a bipolar plate, a monopolar plate, or an elementary plate of such a bipolar or monopolar plate.

16 Claims, 3 Drawing Sheets

(56) References Cited

U.S. PATENT DOCUMENTS

2009/0325036 A1 12/2009 Blank et al.

* cited by examiner

FUEL CELL PLATE AND FUEL CELL

The present invention pertains to the field of fuel cells and more specifically to the creation of the seal between stacked components of a fuel cell.

BACKGROUND

An ion exchange membrane fuel cell comprises a stack of elementary electrochemical cells. Each electrochemical cell comprises a membrane electrode assembly ("MEA") sandwiched between two separator plates.

The membrane electrode assembly is laminated and comprises an ion exchange membrane sandwiched between two electrodes. Each electrode comprises an active layer adjacent to the membrane and a gas diffusion layer. One electrode makes up the anode and the other makes up the cathode.

Each separator plate comprises grooves provided in its face in contact with the membrane electrode assembly in a manner so as to define between the separator plate and the membrane electrode assembly conduits for the circulation of a reactant gas in contact with the membrane electrode assembly. A seal is formed between the separator plates and the membrane electrode assembly in order to ensure the sealing of the conduits for the circulation of a reactant gas.

Optionally, each separator plate is formed by a stack of two elementary plates defining between them the conduits for circulating a cooling fluid. In this case, a seal is formed between the two elementary plates in order to ensure the sealing of the conduits for the circulation of the cooling fluid.

The document FR 2 899 386 discloses an electrochemical cell wherein the seal between the membrane electrode assembly and the separator plates is formed by means of gasket seals attached onto separation spacers.

The document FR 2 887 687 discloses an electrochemical cell wherein a seal between a membrane electrode assembly and a separator plate is formed by a screen printed seal.

The patent document US 2009/0325036 discloses a fuel cell wherein the seal between two elementary plates forming a separator plate is achieved on account of the welding of the individual elementary plates.

SUMMARY OF THE INVENTION

One object of the invention relates to providing a fuel cell plate that offers the ability to form a reliable seal while at the same time being obtained in a simple and economical manner.

To this end, the invention provides a plate for a fuel cell formed from a stack of plates and membrane electrode assemblies, characterised in that it comprises at least one striated sealing surface for bearing in a sealed manner against a membrane electrode assembly or another fuel cell plate.

A striated sealing surface has parallel grooves or striations separated by projecting lines.

According to other methods of implementation, the fuel cell plate comprises one or more of the following characteristic features, considered individually or according to any technically possible combination:

it forms an elementary plate designed to be stacked with another elementary plate in order to form a fuel cell separator plate, and includes at least one striated sealing surface for bearing in a sealed manner against the said other elementary plate;

it comprises a reinforcing film deposited on to the striated sealing surface;

it forms a fuel cell separator plate provided for defining with at least one membrane electrode assembly the channels for the circulation of fluids between the separator plate and the membrane electrode assembly;

it comprises, on one or each face, at least one striated sealing surface for bearing in a sealed manner against a membrane electrode assembly;

it is a monopolar plate or a bipolar plate;

it is formed by two individual elementary plates that are stacked and arranged to bear in a sealed manner against one another by way of at least one pair of sealing surfaces arranged face to face, each formed on a respective elementary plate, with at least one sealing surface being striated; and it comprises at least one pair of sealing surfaces in respect thereof the two sealing surfaces are striated;

it comprises a reinforcing film interposed between two sealing surfaces of a pair of sealing surfaces.

The invention also relates to a fuel cell comprising of a stack of plates and membrane electrode assemblies, each membrane electrode assembly being arranged between two plates defining with the membrane electrode assembly, the channels for the circulation of a fluid between each of the two plates and the membrane electrode assembly, each plate comprising on at least one of the faces thereof a sealing surface for bearing in a sealed manner against the membrane electrode assembly or another plate, characterised in that at least one plate comprises a striated sealing surface.

According to other methods of implementation, the fuel cell includes one or more of the following characteristic features, considered individually or according to any technically possible combination:

it comprises a plate including at least one striated sealing surface for bearing in a sealed manner against a membrane electrode assembly and a reinforcing film between the striated sealing surface and the membrane electrode assembly;

the reinforcing film is interposed between the striated sealing surface and the membrane electrode assembly or deposited on the striated sealing surface and the membrane electrode assembly;

it comprises a separator plate formed of at least two elementary plates stacked so as to bear in a sealed manner against one another by way of at least two sealing surfaces arranged to face each other, at least one of said sealing surfaces being striated; and it comprises a reinforcing film interposed between the two sealing surfaces arranged face to face with the two individual elementary plates of the separator plate.

BRIEF SUMMARY OF THE DRAWINGS

The invention and its advantages will be better understood upon reading the description which follows, provided solely by way of example and with reference being made to the accompanying drawings, in which.

DETAILED DESCRIPTION

Figure 1:
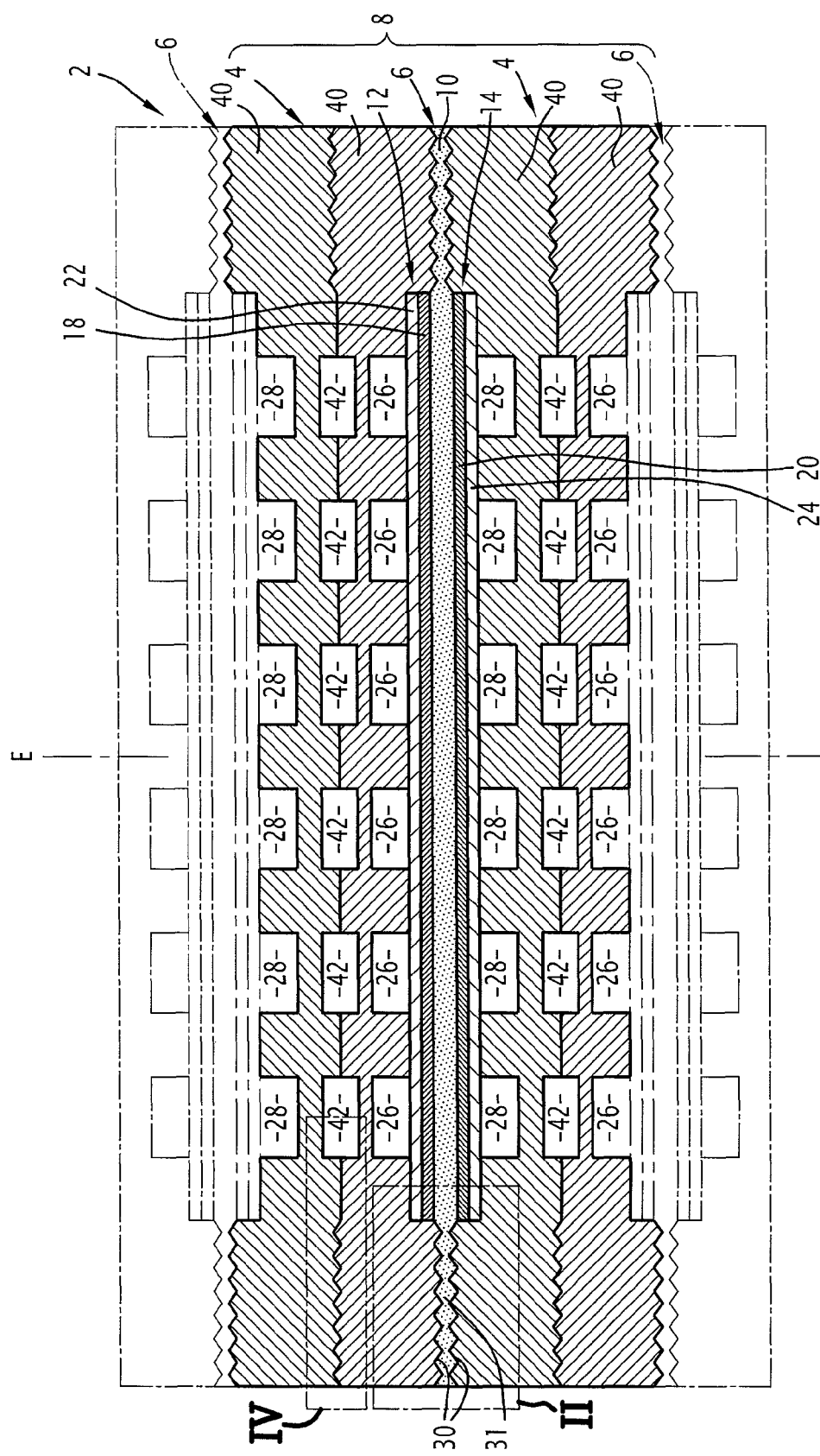
FIG. 1 is a schematic sectional view of a fuel cell according to the invention.

With reference to FIG. 1, the fuel cell 2 comprises a stack of separator plates 4 and membrane electrode assemblies 6 (MEA) arranged in alternation. The term "stack" is commonly used to refer to a stack as such.

In a manner known per se, the stack is maintained under compression along the stacking direction E. The maintenance under compression makes it possible to ensure the seal between the separator plates 4 and the membrane electrode assemblies 6, and to maintain the membrane electrode assemblies 6 under compression between the separator plates 4.

Each membrane electrode assembly 6 is sandwiched between two separator plates 4. Each assembly formed of two separator plates 4 disposed on both sides of a membrane electrode assembly 6 defines an individual elementary electrochemical cell 8 of the fuel cell 2.

One single electrochemical cell 8 is illustrated completely in FIG. 1. A fuel cell comprises in practice one or more electrochemical cells 8.

Each membrane electrode assembly 6 comprises in superimposition an ion exchange membrane 10, sandwiched between two electrodes 12, 14 disposed on both sides of the membrane 10. One electrode 12 defines an anode and the other electrode 14 defines a cathode.

The membrane 10 is in particular a proton exchange membrane, and the fuel cell of the PEM ("Proton Exchange Membrane") type.

Each electrode is electrically conductive. Each electrode 12, 14 is a bilayer and includes one active layer 18, 20, respectively, and a gas diffusion layer 22, 24 respectively.

The separator plates 4 provide for the function of electrical conduction. The separator plates 4 are electrically conductive and in electrical contact with the electrodes 12.

The separator plates 4 provide for the function of distribution of reactant gases on both sides of the membrane electrode assembly 6 and of discharging of the resultant products.

The separator plates 4 illustrated in FIG. 1 are "bipolar": each separator plate 4 is arranged between two membrane electrode assemblies 6 and in contact by means of each of its opposite faces with a respective membrane electrode assembly 6. A separator plate is referred to as "monopolar" when it possesses one single face in contact with a membrane electrode assembly. Such monopolar separator plates (not shown) are found at the ends of the stack of the fuel cell 2.

Each separator plate 4 is in contact by means of one of its faces with an anode forming electrode 12 of a membrane electrode assembly 6 and in contact by means of the other of its faces with a cathode forming electrode 14 of the other membrane electrode assembly 6.

Each separator plate 4 includes a plurality of grooves provided on each of its faces in contact with a membrane electrode assembly 6 in order to define between the separator plate 4 and this membrane electrode assembly 6, the supply conduits 26, 28 for the circulation of reactive gases along a face of the membrane electrode assembly 6, in contact with an electrode 12, 14 of the membrane electrode assembly 6.

In a manner known per se, the anode supply conduits 26 of the various different electrochemical cells 8 of a fuel cell 2 are fluidly connected to each other to provide for the supply of fuel and discharge of the fluids produced. The cathode supply conduits 28 of the various different electrochemical cells 8 of a fuel cell 2 are fluidly connected to each other to provide for the supply of the oxidising—combustion agent and discharge of the fluids produced.

During operation, the anode supply conduits 26 defined along the anode forming electrodes 12 are supplied with fuel, for example hydrogen, and the cathode supply conduits 28 defined along the cathode forming electrodes 14 are supplied with the oxidising—combustion agent, for example oxygen or air.

In each electrochemical cell 8, the hydrogen undergoes upon contact with the anode forming electrode 12 a catalytic oxidation reaction releasing protons and electrons.

The electrons flow in an external electrical circuit. The protons pass through the membrane electrode assembly 6 and get recombined with the oxygen and electrons supplied by the cathode forming electrode 14 thereby producing water in the cathode compartment. An electric potential difference appears between the separator plates 4 on both sides of each membrane electrode assembly 6. The stack of electrochemical cells 8 provides the ability to adapt the desired values of voltage and current.

In order to ensure the sealing of the supply conduits 26, 28 against the exterior environment, each separator plate 4 is arranged to bear in a sealed manner against a membrane electrode assembly 6 by means of the plate/MEA sealing surfaces 30.

The membrane 10 of each membrane electrode assembly 6 has a clear edge region 31 that is not covered by the electrodes 12, 14 and each separator plate 4 is arranged to bear in a sealed manner against the edge region 31 of the membrane 10.

Figure 2:
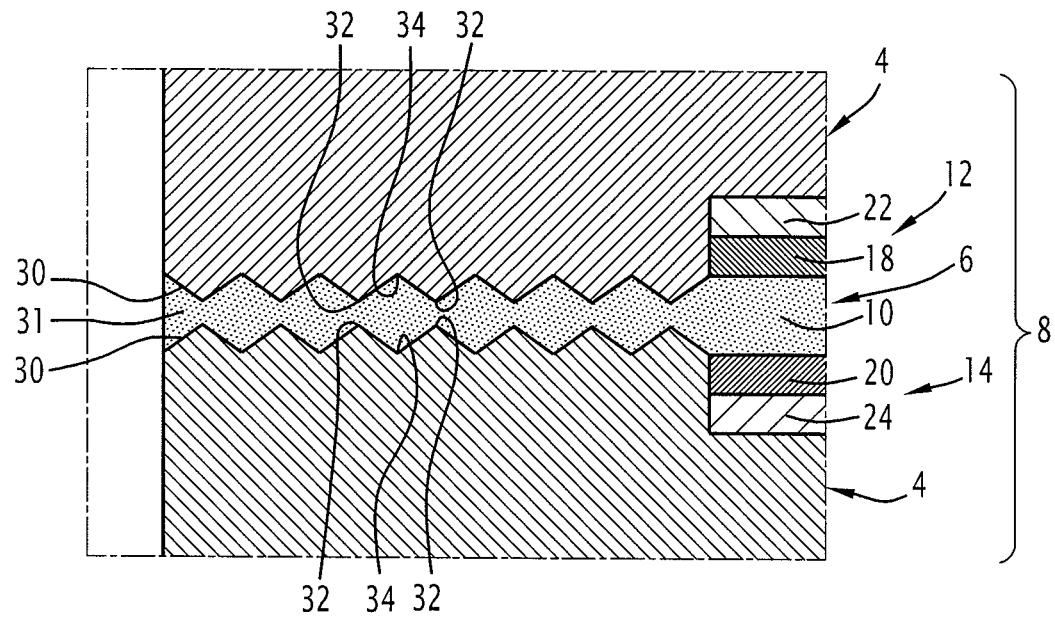
FIG. 2 is an enlarged view of zone II as in FIG. 1.

As shown in FIG. 2, the plate/MEA sealing surfaces 30 are striated. Each plate/MEA sealing surface 30 thus has a plurality of protruding lines 32 defining between them parallel grooves or striations 34. The edge region 31 of the membrane 10 is clamped between the striated plate/MEA sealing surfaces 30 positioned facing two separator plates 4.

Each plate/MEA sealing surface 30 is arranged to bear in a sealed manner against a membrane electrode assembly 6, and more particularly the membrane 10 thereof, by means of its plurality of protruding lines 32.

Under the effect of the stack of the fuel cell 2 being maintained under compression, the protruding lines 32 of the striated plate/MEA sealing surfaces 30 penetrate into the membrane 10.

As a result thereof the plate/MEA sealing surfaces 30 provide for the adequate sealing between each separator plate 4 and the membrane 10, without it being necessary to provide for additional sealing means.

Figure 3:
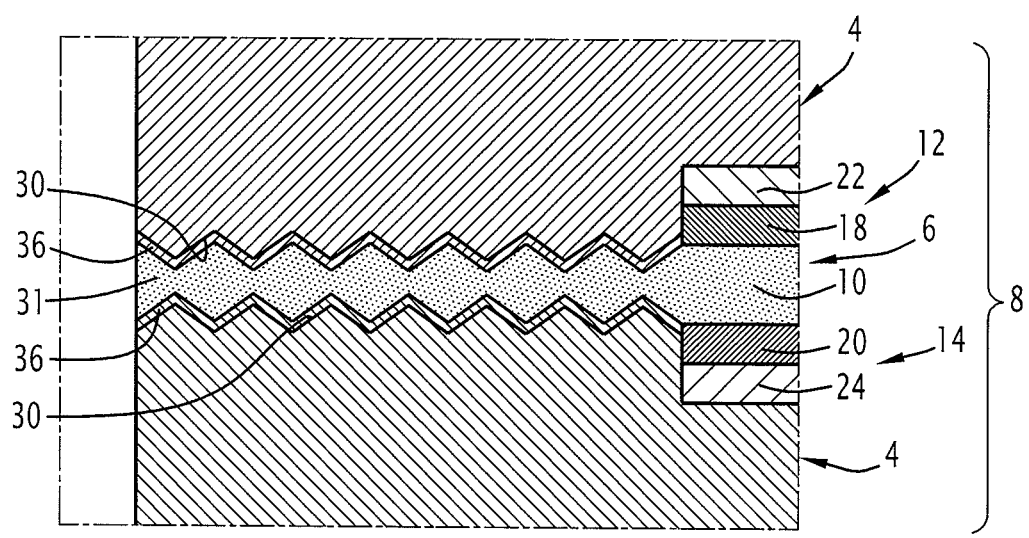
FIG. 3 is a view similar to that in FIG. 2 illustrating a variant of the embodiment.

In a variant illustrated in FIG. 3, a reinforcing film 36 is disposed between each striated plate/MEA sealing surface 30 and the membrane 10.

The reinforcing film 36 is intended to prevent the deterioration of the protruding lines 32 and/or of the membrane 10.

The reinforcing film 36 is a flexible film capable of taking on the shape of the protruding lines 32, separated from the separator plate 4 and the membrane 10 and disposed between the striated plate/MEA sealing surface 30 and the membrane 10 during the setting in place of the stack. By way of a variant, the reinforcing film 36 is formed by being deposited on the plate/MEA sealing surface 30 or the membrane 10.

The reinforcing film 36 is for example made of polytetrafluoroethylene (PTFE).

Advantageously, the separator plates 4 provide for the function of cooling of the fuel cell.

To this end, as shown in FIG. 1, each separator plate 4 is designed as a "biplate": it is formed by the stacking of two elementary plates 40.

Each membrane electrode assembly 6 is sandwiched between two elementary plates 40 of two different separator plates 4. Each individual elementary plate 40 is stacked with a membrane electrode assembly 6 thereby defining with the latter the anode supply conduits 26 or the cathode supply conduits 28.

The elementary plates 40 are electrically conductive. The associated elementary plates 40 forming a separator plate 4 are electrically connected between each other.

The elementary plates 40 are configured so as to define therebetween the internal cooling conduits 42 within the separator plate 4 for the circulation of a cooling fluid.

In order to ensure the sealing of the internal cooling channels conduits 42 against the exterior environment, the elementary plates 40 are arranged to bear in a sealed manner against each other by means of the plate/plate sealing surfaces 44.

The plate/plate sealing surfaces 44 are arranged in pairs, each pair comprising two plate/plate sealing surfaces 44 arranged facing each other, each formed on a respective elementary plate 40.

Figure 4:
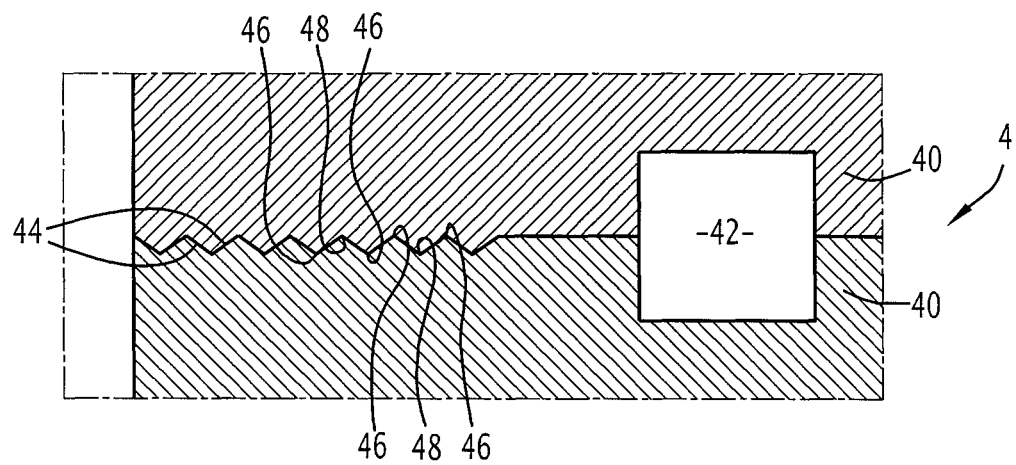
FIG. 4 is an enlarged view of zone IV as in FIG. 1.

As shown in FIG. 4, each individual elementary plate 40 bears on its face turned towards the associated elementary plate 40 the plate/plate sealing surfaces 44. Each plate/plate sealing surface 44 is striated and includes a plurality of parallel protruding lines 46 forming peak points defining between them grooves or striations 48.

Each plate/plate sealing surface 44 of an elementary plate 40 is arranged to bear in a sealed manner against another elementary plate 40, and more particularly a plate/plate sealing surface 44 of this other elementary plate 40 situated facing it, by means of its plurality of protruding lines 46.

Under the effect of the stack of the fuel cell 2 being maintained under compression, the plate/plate sealing surfaces 44 of a given single pair get interlocked together and provide for sufficient sealing between the elementary plates 40, without it being necessary to provide for additional sealing means.

As shown in FIG. 4, two plate/plate sealing surfaces 44 arranged facing two elementary plates 40 are each striated. By way of a variant, only one of the two plate/plate sealing surfaces 44 is striated, and the other is smooth.

The plate/MEA striated sealing surfaces 30 of each separator plate 4 are formed on the faces of the elementary plates 40 forming the separator plate 4 turned to face the exterior of the separator plate, intended to be facing a membrane electrode assembly 6.

Figure 5:
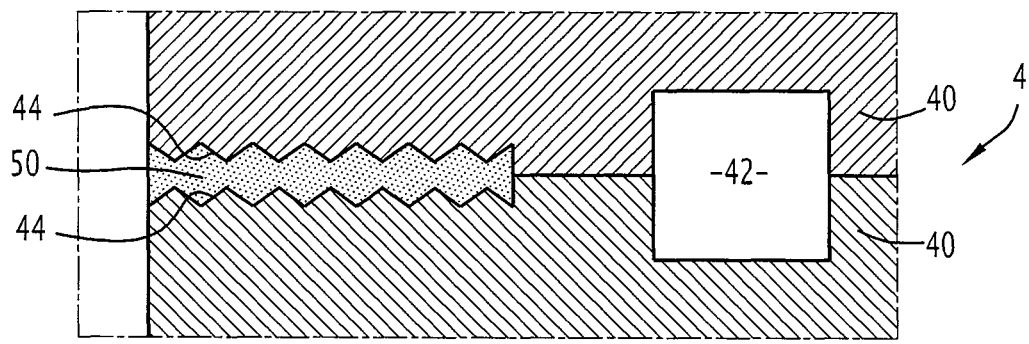
FIGS. 5 and 6 are views similar to that in FIG. 4 illustrating variants of the embodiment.

As shown in FIG. 5, in one variant, a reinforcing film 50 is interposed between two plate/plate sealing surfaces 44 facing each other. The reinforcing film 50 is separated from the elementary plates 40 and interposed therebetween when stacked or deposited on one of the elementary plates.

The reinforcing film 50 extends exclusively over the plate/plate sealing surfaces 44 and the elementary plates 40 are also in direct contact which ensures their electrical connection. The reinforcing film 50 is made of an electrically conductive or insulating material.

Figure 6:
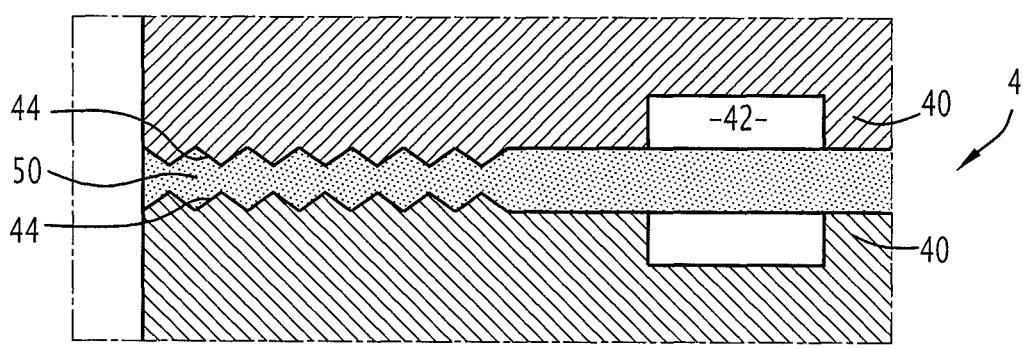

As shown in FIG. 6, in a variant, the reinforcing film 50 extends over the entire surface of the elementary plates 40. The elementary plates 40 are separated by the reinforcing film 50.

In this case, the reinforcing film 50 is electrically conductive so as to ensure the electrical connection between the elementary plates 40.

Thanks to embodiments of the invention, it is possible to create the sealing between the membrane electrode assemblies and the separator plates and between the elementary plates of a separator plate in a simple manner and at low cost.

A fuel cell plate comprises at least one striated sealing surface comprising a plurality of parallel projecting lines, in order to bear in a sealed manner against a membrane electrode assembly or another fuel cell plate by means of its plurality of protruding lines.

The striated sealing surfaces are obtained easily, regardless of whether this is on machined or moulded metal plates or plates made of composite materials comprising a matrix reinforced by fibres, for example obtained by moulding.

Embodiments of the invention are applicable to the manufacture of proton exchange membrane (PEM) fuel cells and more generally to ion exchange membrane fuel cells. It is applicable in particular also to "Solid Oxide Fuel Cells" referred to as SOFC.

What is claimed is:

1. A plate for a fuel cell formed from a stack of plates and membrane electrode assemblies, the plate comprising:
   at least one striated sealing surface including a plurality of protruding lines forming peak points defining between them parallel striations, the at least one striated sealing surface configured for bearing in a sealed manner against a membrane electrode assembly or another fuel cell plate, wherein the protruding lines are configured for bearing directly or via a reinforcing film against a membrane of the membrane electrode assembly or the other fuel cell plate, wherein the striations are configured for bearing directly or via the reinforcing film against the membrane of the membrane electrode assembly or the other fuel cell plate.

2. The plate as recited in claim 1 wherein the reinforcing film is a flexible film configured for taking on a shape of the protruding lines.

3. The plate as recited in claim 1 wherein the plate forms an elementary plate designed to be stacked with another elementary plate in order to form a fuel cell separator plate, the at least one striated sealing surface of the elementary plate being configured for bearing in a sealed manner against the said other elementary plate.

4. The plate as recited in claim 3 further comprising a reinforcing film deposited on to the at least one striated sealing surface.

5. The plate as recited in claim 1 wherein the plate forms a fuel cell separator plate provided for defining with at least one membrane electrode assembly channels for a circulation of fluids between the separator plate and the membrane electrode assembly.

6. The plate as recited in claim 5 further comprising at least one face, the at least one striated sealing surface being formed on one or each of the at least one face for bearing in a sealed manner against the membrane electrode assembly.

7. The plate as recited in claim 5 wherein the plate is bipolar or monopolar.

8. The plate as recited in claim 5 wherein the plate is formed by two individual elementary plates that are stacked and arranged to bear in a sealed manner against one another by way of at least one pair of sealing surfaces arranged face to face, each formed on a respective one of the elementary plates, the at least one striated sealing surface forming at least one of the at least one pair of sealing surfaces.

9. The plate as recited in claim 5 wherein the at least one striated sealing surface includes two striated sealing surfaces paired together.

10. The plate as recited in claim 9 further comprising a reinforcing film interposed between the two striated sealing surfaces of one of the at least one pair of sealing surfaces.

11. A fuel cell comprising:

a stack of plates and membrane electrode assemblies, each membrane electrode assembly being arranged between two of the plates defining with the corresponding membrane electrode assembly, channels for a circulation of a fluid between each of the two plates and the corresponding membrane electrode assembly, each plate including on at least one face thereof a sealing surface for bearing in a sealed manner against the corresponding membrane electrode assembly or another plate, at least one of the plates including a striated sealing surface including a plurality of protruding lines forming peak points defining between them parallel striations, wherein the protruding lines are configured for bearing directly or via a reinforcing film against a membrane of the membrane electrode assembly or the other fuel cell plate, wherein the striations are configured for bearing directly or via the reinforcing film against the membrane of the membrane electrode assembly or the other fuel cell plate.

12. The fuel cell as recited in claim 11 wherein the reinforcing film is a flexible film configured for taking on a shape of the protruding lines.

13. The fuel cell as recited in claim 11 wherein the striated sealing surface bears in a sealed manner against the corresponding membrane electrode assembly, the fuel cell further comprising a reinforcing film between the striated sealing surface and the corresponding membrane electrode assembly.

14. The fuel cell as recited in claim 13 wherein the reinforcing film is interposed between the striated sealing surface and the corresponding membrane electrode assembly or deposited on the striated sealing surface and the corresponding membrane electrode assembly.

15. The fuel cell as recited in claim 11 wherein the at least one plate including the striated sealing surface is a separator plate formed of at least two elementary plates stacked so as to bear in a sealed manner against one another by way of at least two sealing surfaces arranged to face each other, at least one of the two sealing surfaces being the striated sealing surface.

16. The fuel cell as recited in claim 15 further comprising a reinforcing film interposed between the two sealing surfaces arranged face to face with the two individual elementary plates of the separator plate.

* * * * *